United States Patent
Aoki

(10) Patent No.: US 10,413,994 B2
(45) Date of Patent: Sep. 17, 2019

(54) LASER PROCESSING ROBOT SYSTEM FOR PERFORMING LASER PROCESSING USING ROBOT

(71) Applicant: FANUC CORPORATION, Minamitsuru-gun, Yamanashi (JP)

(72) Inventor: Toshimichi Aoki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 11 days.

(21) Appl. No.: 15/634,473

(22) Filed: Jun. 27, 2017

(65) Prior Publication Data

US 2018/0009059 A1 Jan. 11, 2018

(30) Foreign Application Priority Data

Jul. 8, 2016 (JP) ................................ 2016-135972

(51) Int. Cl.
*B23K 26/03* (2006.01)
*B23K 26/046* (2014.01)
(Continued)

(52) U.S. Cl.
CPC .......... *B23K 26/032* (2013.01); *B23K 26/046* (2013.01); *B23K 26/0884* (2013.01);
(Continued)

(58) Field of Classification Search
CPC .. B23K 26/70; B23K 26/046; B23K 26/0884; B23K 26/032; B25J 9/1697;
(Continued)

(56) References Cited

U.S. PATENT DOCUMENTS 4,920,249 A * 4/1990 McLaughlin ........ B23K 9/0956
219/124.34
5,204,814 A * 4/1993 Noonan ............... A01D 34/008
180/168
(Continued)

FOREIGN PATENT DOCUMENTS

CN 100408282 C 8/2008
CN 104923923 A 9/2015
(Continued)

OTHER PUBLICATIONS

Decision to Grant a Patent for Japanese Application No. 2016-135972, dated May 8, 2018 with translation, 4 pages.
(Continued)

*Primary Examiner* — Jimmy Chou
(74) *Attorney, Agent, or Firm* — RatnerPrestia

(57) ABSTRACT

A laser processing robot system, in which an augmented reality processing technology is used to enable a processing laser beam and its irradiation position to be safely and easily seen, is provided. A laser processing robot system includes an image processing device having an augmented reality image processing unit for performing augmented reality image processing for an actual image including an image of a robot captured by an imaging device. The augmented reality image processing unit is adapted to superimpose a virtual image representing at least one of a laser beam obtained by assuming that the laser beam is emitted from a laser irradiation device to a workpiece, and an irradiation position of the laser beam, onto the actual image, and to display the superimposed image on the display device.

8 Claims, 4 Drawing Sheets

(51) Int. Cl.
*B23K 26/08* (2014.01)
*B25J 9/16* (2006.01)
*G06T 19/00* (2011.01)
*H04N 5/232* (2006.01)
*B23K 26/70* (2014.01)

(52) U.S. Cl.
CPC ............ *B23K 26/70* (2015.10); *B25J 9/1697* (2013.01); *G06T 19/006* (2013.01); *H04N 5/23293* (2013.01); *G05B 2219/36167* (2013.01); *G05B 2219/39449* (2013.01); *G05B 2219/45041* (2013.01); *G05B 2219/45104* (2013.01); *G05B 2219/45138* (2013.01); *G05B 2219/45139* (2013.01)

(58) Field of Classification Search
CPC .............. G06T 19/006; H04N 5/23293; G05B 2219/36167; G05B 2219/39449; G05B 2219/45041; G05B 2219/45104; G05B 2219/45138; G05B 2219/45139
USPC ............ 219/121.83, 121.67, 121.63, 121.68, 219/121.6, 121.62, 121.82
See application file for complete search history.

(56) References Cited

U.S. PATENT DOCUMENTS

| | | | | |
|---|---|---|---|---|
| 5,233,150 A * | 8/1993 | Schneebeli | ............ | B23K 9/044 219/76.14 |
| 5,533,146 A * | 7/1996 | Iwai | .................... | B23K 9/0956 219/121.63 |
| 5,552,575 A * | 9/1996 | Doumanidis | ........ | B23K 9/0953 219/121.14 |
| 5,689,327 A * | 11/1997 | Takeda | ................... | B23K 26/16 219/121.6 |
| 5,718,832 A * | 2/1998 | Mori | .................... | B23K 26/032 219/121.67 |
| 6,043,452 A * | 3/2000 | Bestenlehrer | ........ | B23K 26/032 219/121.62 |
| 6,073,464 A * | 6/2000 | Boher | .................. | B24B 37/013 219/121.6 |
| 6,430,472 B1 * | 8/2002 | Boillot | ................ | G05B 19/056 219/121.61 |
| 6,617,544 B1 * | 9/2003 | Tsukamoto | ............ | B23K 26/08 219/121.79 |
| 6,657,156 B2 * | 12/2003 | Kubota | ................. | B23K 26/04 219/121.63 |
| 6,839,042 B2 * | 1/2005 | Conemac | ................ | G09G 3/02 345/108 |
| 6,860,132 B2 * | 3/2005 | Butscher | .................. | A61C 7/04 72/302 |
| 6,974,930 B2 * | 12/2005 | Jense | ................ | B23K 26/0846 219/121.8 |
| 7,248,940 B2 * | 7/2007 | Neumann | ............ | B23K 26/046 219/121.6 |
| 7,405,377 B2 * | 7/2008 | James | .................. | B23K 31/12 219/130.01 |
| 7,595,933 B2 * | 9/2009 | Tang | .................. | G02B 27/0172 345/8 |
| 7,633,033 B2 * | 12/2009 | Thomas | ................ | B23K 26/03 219/121.62 |
| 7,800,014 B2 * | 9/2010 | Thomas | ................ | B08B 7/0042 219/121.62 |
| 7,904,201 B2 * | 3/2011 | Nagatsuka | ............ | B25J 9/1682 700/245 |
| 8,084,708 B2 * | 12/2011 | Andreasch | ............ | B23K 26/04 219/121.62 |
| 8,168,919 B2 * | 5/2012 | Hamaguchi | ............ | B23K 26/04 219/121.63 |
| 8,198,565 B2 * | 6/2012 | Lu | ...................... | B23K 26/0604 219/121.63 |
| 8,399,802 B2 * | 3/2013 | Idaka | .................... | B23K 26/03 219/121.83 |
| 8,412,371 B2 * | 4/2013 | Komatsu | ............... | B23K 26/04 219/121.63 |
| 8,428,776 B2 * | 4/2013 | Letsky | ................. | A01D 34/008 700/245 |
| 8,471,182 B2 * | 6/2013 | Stauffer | ................ | B23K 9/044 219/121.59 |
| 8,487,209 B2 * | 7/2013 | Sakamoto | .......... | B23K 26/0884 219/121.63 |
| 8,536,483 B2 * | 9/2013 | Thomas | ................ | B08B 7/0042 219/121.68 |
| 8,588,974 B2 * | 11/2013 | Aoba | .................. | B25J 9/1692 700/194 |
| 9,286,725 B2 * | 3/2016 | Vasquez, II | .......... | G06T 19/006 |
| 9,625,899 B2 * | 4/2017 | Kuwahara | ............... | B25J 9/1671 |
| 10,140,767 B2 * | 11/2018 | Shikoda | ............... | G06T 19/006 |
| 2004/0124227 A1 * | 7/2004 | Seki | ...................... | B23K 9/0953 228/103 |
| 2004/0206735 A1 * | 10/2004 | Okuda | ................... | B23K 26/04 219/121.78 |
| 2005/0102060 A1 * | 5/2005 | Watanabe | ............... | B25J 9/1697 700/245 |
| 2005/0107919 A1 * | 5/2005 | Watanabe | ............... | B25J 9/1656 700/245 |
| 2005/0150876 A1 * | 7/2005 | Menin | ................ | B23K 26/0884 219/121.63 |
| 2005/0150878 A1 * | 7/2005 | Thomas | ................. | B23K 26/03 219/121.68 |
| 2005/0258152 A1 * | 11/2005 | Kawamoto | ............ | B23K 26/03 219/121.62 |
| 2005/0269302 A1 * | 12/2005 | Horn | ...................... | B23K 26/10 219/121.78 |
| 2006/0060573 A1 * | 3/2006 | Becker | ............... | B23K 26/0884 219/121.64 |
| 2006/0072809 A1 * | 4/2006 | Hashimoto | ............ | B25J 9/1697 382/153 |
| 2006/0175301 A1 * | 8/2006 | Rippl | ................ | B23K 26/0884 219/121.8 |
| 2006/0226128 A1 * | 10/2006 | Otsuka | ................ | B23K 26/0884 219/121.64 |
| 2006/0235564 A1 * | 10/2006 | Troitski | ..................... | B44F 1/04 700/166 |
| 2007/0075054 A1 * | 4/2007 | Nakamura | ............ | B23K 26/04 219/121.61 |
| 2007/0210040 A1 * | 9/2007 | Sakamoto | .......... | B23K 26/0884 219/121.63 |
| 2008/0006615 A1 * | 1/2008 | Rosario | .................. | B23K 15/08 219/121.68 |
| 2008/0017619 A1 * | 1/2008 | Yamakawa | ............ | B23K 26/03 219/121.81 |
| 2008/0035619 A1 * | 2/2008 | Hamaguchi | ............ | B23K 26/04 219/121.79 |
| 2008/0136065 A1 * | 6/2008 | Ohlinger | ................ | B23K 26/36 264/482 |
| 2008/0172143 A1 * | 7/2008 | Schwarz | ............... | B23K 26/0861 700/166 |
| 2009/0230100 A1 * | 9/2009 | Menin | .................. | B23K 26/244 219/121.63 |
| 2009/0265030 A1 * | 10/2009 | Huang | ............... | G05B 19/4068 700/182 |
| 2010/0038347 A1 * | 2/2010 | Schwarz | ............... | B23K 26/0861 219/121.64 |
| 2010/0044357 A1 * | 2/2010 | Thomas | ................ | B23K 26/03 219/121.69 |
| 2010/0155375 A1 * | 6/2010 | Dietz | .................... | B23K 26/03 219/121.18 |
| 2010/0164739 A1 * | 7/2010 | Heberer | ................ | B23K 26/032 340/679 |
| 2010/0219171 A1 * | 9/2010 | Sato | ...................... | B23K 26/04 219/121.75 |
| 2010/0272961 A1 * | 10/2010 | Costin, Jr. | ............... | B44C 1/228 428/156 |
| 2010/0314362 A1 * | 12/2010 | Albrecht | ............... | B23K 9/0953 219/121.63 |

(56) References Cited

U.S. PATENT DOCUMENTS

| | | | |
|---|---|---|---|
| 2011/0120978 A1* | 5/2011 | Takahashi | B23K 11/115 219/86.25 |
| 2011/0139752 A1* | 6/2011 | Carter | B23K 26/702 219/121.7 |
| 2013/0095924 A1* | 4/2013 | Geisner | G06F 3/012 463/32 |
| 2013/0276280 A1* | 10/2013 | Wielens | B23Q 17/22 29/407.04 |
| 2014/0025191 A1* | 1/2014 | Wadehn | B23K 26/048 700/166 |
| 2014/0277737 A1 | 9/2014 | Sekiyama et al. | |
| 2014/0312015 A1* | 10/2014 | Kurachi | B23K 26/067 219/121.71 |
| 2015/0298260 A1* | 10/2015 | Morel | B41M 5/24 219/121.69 |
| 2016/0059347 A1* | 3/2016 | Kogel-Hollacher | B23K 26/03 219/121.74 |
| 2016/0078681 A1 | 3/2016 | Shikoda et al. | |
| 2016/0158937 A1 | 6/2016 | Kamoi et al. | |

FOREIGN PATENT DOCUMENTS

| | | |
|---|---|---|
| JP | 07214349 A | 8/1995 |
| JP | 2007-253200 A | 10/2007 |
| JP | 2012157867 A | 8/2012 |
| JP | 2012218120 A | 11/2012 |
| JP | 2013-123743 A | 6/2013 |
| JP | 2013166151 A | 8/2013 |
| JP | 2014180707 A | 9/2014 |
| JP | 2016107379 A | 6/2016 |
| JP | 2014175324 A | 2/2017 |

OTHER PUBLICATIONS

Chinese Office Action for Chinese Application No. 201710451584.8, dated Aug. 29, 2018 with translation, 9 pages.

* cited by examiner

LASER PROCESSING ROBOT SYSTEM FOR PERFORMING LASER PROCESSING USING ROBOT

BACKGROUND OF THE INVENTION

1. Field of the Invention

The present invention relates to a laser processing robot system for performing laser processing using a robot.

2. Description of the Related Art

In recent years, laser processing robot systems, in which a laser irradiation device for irradiating a workpiece with a processing laser beam is attached to a distal end of a robot arm, to perform laser processing by moving the robot arm, have appeared in the market. Further, in laser processing using a laser processing robot system, a technology for performing laser processing at a predetermined position while moving a laser beam by changing the irradiation direction of the laser beam from the laser irradiation device while moving the robot arm has been known. In such a laser processing method, the distance between a workpiece and a laser irradiation device is larger than that in a conventional laser processing method. Thus, the method is sometimes referred to as "remote laser processing". Specific examples of the processing include welding, cutting, boring, etc.

In this type of remote laser processing, a workpiece is spaced from a laser irradiation device, and accordingly, when a laser processing operation is taught to a robot, it is difficult to find out a position to be irradiated with a processing laser beam. This remarkably reduces the efficiency in a teaching operation for a robot. In general, in laser processing, it is necessary that the irradiation position of a processing laser beam precisely coincide with a processing portion of the workpiece. Thus, the difficulty of finding out the irradiation position of a processing laser beam causes reduction of the processing accuracy.

In order to solve these problems, Japanese Unexamined Patent Publication (Kokai) No. 2007-253200 discloses a method for introducing a pilot laser of visible light to the emitted welding laser beam, to cause a focal position of the welding laser beam to be easily found out. Further, Japanese Unexamined Patent Publication (Kokai) No. 2013-123743 discloses a method for detecting the position of a portion to be irradiated with a welding laser beam by an image processing device.

However, in the method disclosed in Japanese Unexamined Patent Publication (Kokai) No. 2007-253200, i.e., a method for easily finding out a position to be irradiated with a welding laser beam using a pilot laser, it is necessary to additionally mount a mechanism for irradiating a workpiece with a pilot laser to a laser irradiation device. This causes the laser irradiation device to be complicated and increases cost. Further, the pilot laser is not necessary during actual producing and processing, and accordingly, the laser irradiation device has a redundant configuration.

Further, in the method disclosed in Japanese Unexamined Patent Publication (Kokai) No. 2013-123743, a welding laser beam is actually emitted, and an image processing device detects a position to be irradiated with the beam. Thus, even when the brightness of a welding laser beam is reduced, or the laser irradiation device emits a low-power laser, as long as a welding laser beam is actually emitted, there is a risk that the human body, specifically, the retina may be damaged. Thus, as in the teaching of a laser processing operation to a robot, in an operation for deciding a position to be irradiated with a processing laser beam, avoiding the use of a processing laser beam to the extent possible is demanded for safety purposes.

SUMMARY OF THE INVENTION

The present invention provides a laser processing robot system in which, even when a processing laser beam is not actually emitted, an operator can safely and easily see the processing laser beam and its irradiation position.

According to a first aspect of this disclosure, there is provided a laser processing robot system for performing laser processing of a workpiece, using a robot having an arm to which a laser irradiation device for emitting a laser beam for processing is attached. The laser processing robot system includes a robot control device which causes the robot to perform an operation of the laser processing without output of the laser beam, an imaging device for capturing an actual image including the robot which is caused to perform an operation of the laser processing without output of the laser beam, a display device for displaying, in real time, the actual image, and an image processing device which is connected to the robot control device and which has an augmented reality image processing unit for performing augmented reality image processing for the actual image. The augmented reality image processing unit is adapted to superimpose a virtual image representing at least one of a laser beam obtained by assuming that the laser beam is emitted from the laser irradiation device to the workpiece, and an irradiation position of the laser beam, onto the actual image, and to display the superimposed image on the display device.

According to a second aspect of this disclosure, in the laser processing robot system in the first aspect, the laser irradiation device includes a lens position adjusting mechanism which adjusts the position of a lens in response to a command from the robot control device, to change a focal length, and the augmented reality image processing unit is adapted to generate the virtual image based on a command value or a detection value regarding the focal length and the position of the lens.

According to a third aspect of this disclosure, in the laser processing robot system in the first or second aspect, the laser irradiation device includes an irradiation position changing mechanism for changing the irradiation position of the laser beam on a surface of the workpiece in response to a command from the robot control device, and the augmented reality image processing unit is adapted to generate the virtual image based on a command value or a detection value regarding the irradiation position.

According to a fourth aspect of this disclosure, in the laser processing robot system in any of the first to third aspects, the augmented reality image processing unit is adapted to display the locus of at least one of the laser beam represented as the virtual image and the irradiation position of the laser beam on the display device.

According to a fifth aspect of this disclosure, in the laser processing robot system in any of the first to fourth aspects, the robot control device is adapted to convey information regarding irradiation conditions for irradiation with the laser beam to the image processing device, and the augmented reality image processing unit is adapted to display, along with the virtual image, the information regarding the irradiation conditions on the display device.

According to a sixth aspect of this disclosure, in the laser processing robot system in any of the first to fifth aspects, the augmented reality image processing unit is adapted to change at least one of the display color and display size of the laser beam when the virtual image is generated.

According to a seventh aspect of this disclosure, in the laser processing robot system in the sixth aspect, the augmented reality image processing unit is adapted to change at least one of the display color and display size of the laser beam in accordance with irradiation conditions for irradiation with the laser beam.

According to an eighth aspect of this disclosure, in the laser processing robot system in any of the first to seventh aspects, the display device is a head-mounted display configured to be integral with the imaging device.

BRIEF DESCRIPTION OF THE DRAWINGS

These objects, features, and advantages of the present invention and other objects, features, and advantages will become further clearer from the detailed description of typical embodiments illustrated in the appended drawings.

DETAILED DESCRIPTION

Figure 1:
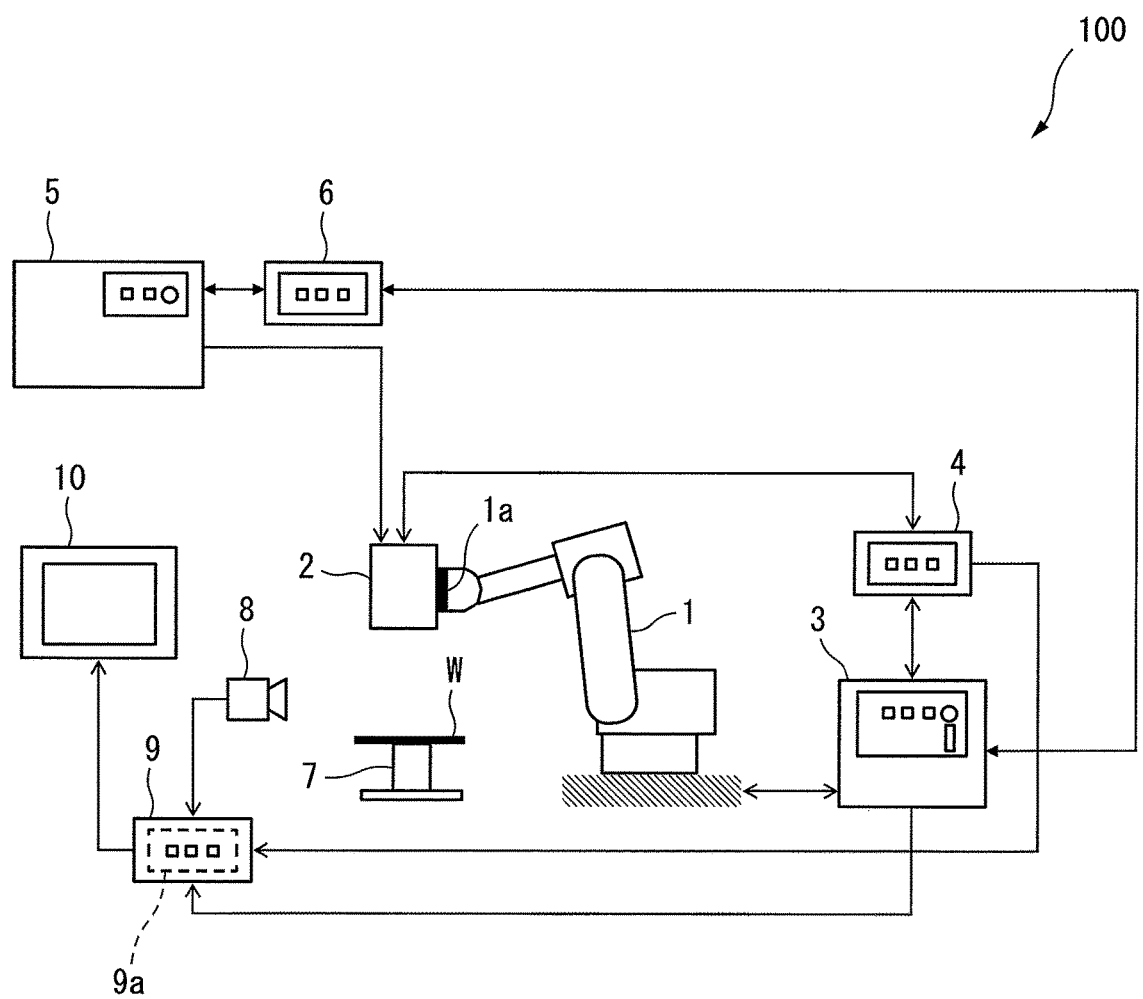
FIG. 1 is a block diagram conceptually illustrating the configuration of a laser processing robot system according to an embodiment.

Embodiments of the present invention will be described below with reference to the accompanying drawings. In the following figures, similar members are designated with the same reference numerals. These figures are properly modified in scale to assist the understanding thereof. Further, the embodiments shown in the drawings are merely examples for carrying out the present invention, and the present invention is not limited to the illustrated embodiments.

FIG. 1 is a block diagram conceptually illustrating the configuration of a laser processing robot system according to an embodiment.

As shown in FIG. 1, in a laser processing robot system 100, a robot 1 having a laser irradiation device 2 provided at a distal end 1a of a robot arm is used to perform laser processing of a workpiece W placed on a bench 7. Examples of the laser processing include laser welding, laser cutting, laser boring, etc.

The laser processing robot system 100 includes a robot control device 3 for controlling the robot 1, a control device for controlling the laser irradiation device 2 (hereinafter referred to as "laser irradiation device controlling device 4), a laser oscillator 5 connected to the laser irradiation device 2, a control device for controlling the laser oscillator 5 (hereinafter referred to as "laser oscillator controlling device 6"), and an image processing device 9 connected to the robot control device 3.

Specifically, the robot control device 3 of this embodiment enables the robot 1 to perform a laser processing operation without output of a laser beam.

Further, the laser processing robot system 100 includes, as shown in FIG. 1, an imaging device 8 and a display device 10, which are connected to the image processing device 9.

The imaging device 8 is a camera for capturing an image of a work space for performing laser processing. The work space includes at least the robot 1, the workpiece W to be processed, and the bench 7 on which the workpiece W is to be placed. The imaging device 8 is adapted to capture an actual image including the robot 1 which performs laser processing without output of a laser beam.

The image processing device 9 has an augmented reality image processing unit 9a for performing augmented reality image processing of the actual image.

The augmented reality image processing unit 9a is adapted to superimpose a virtual image representing at least one of a laser beam obtained by assuming that the laser beam is emitted from the laser irradiation device 2 to a surface of the workpiece W, and a position to be irradiated with the laser beam, onto the actual image, and to display the superimposed image on the display device 10.

The display device 10 displays, in real time, the actual image captured by the imaging device 8. The display device 10 also displays the image superimposed by the augmented reality image processing unit. The display device 10 may be provided separately from the imaging device 8, or may be integral with the imaging device 8.

Figure 2:
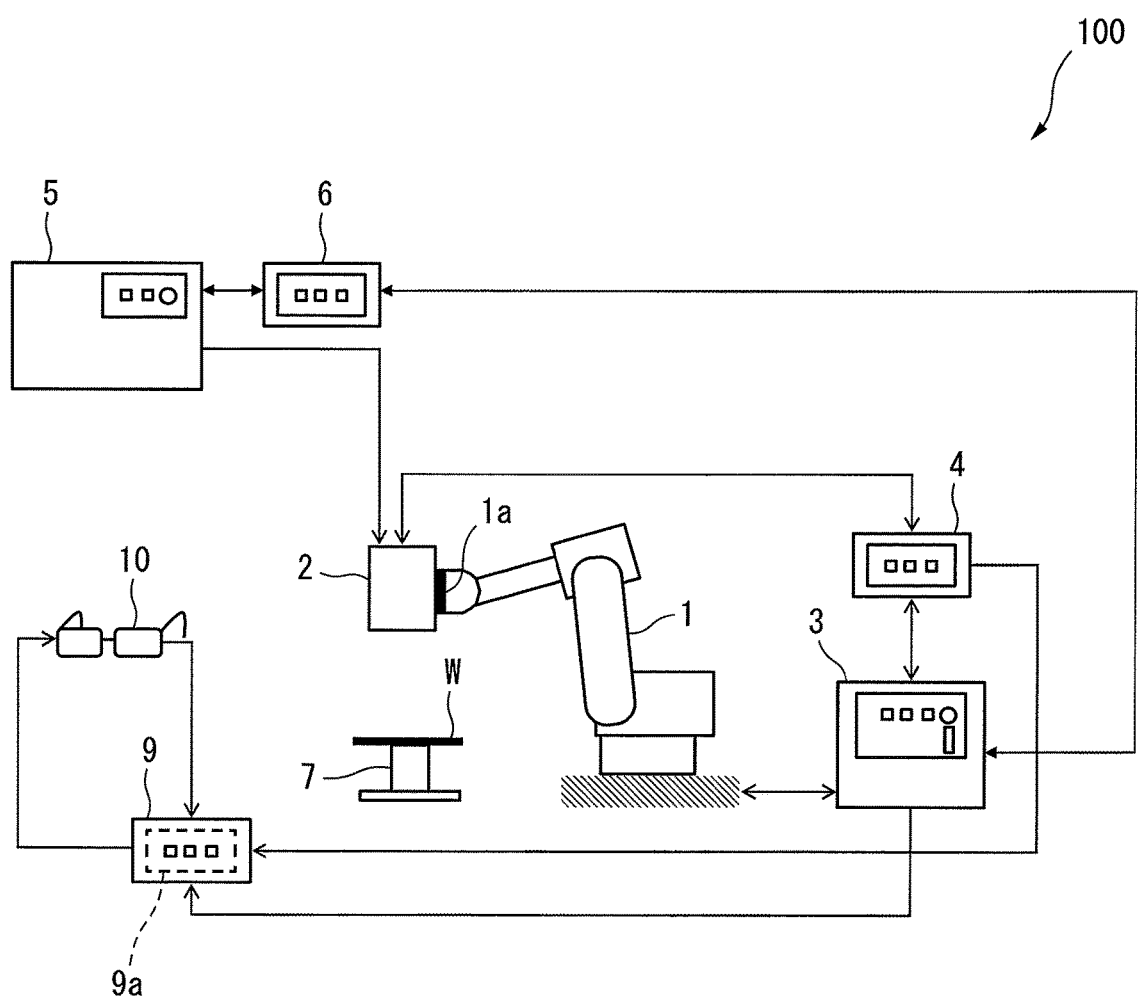
FIG. 2 is a block diagram of a modification of the laser processing robot system shown in FIG. 1.

FIG. 2 is a block diagram of a modification of the laser processing robot system 100 shown in FIG. 1. In the laser processing robot system 100, as shown in FIG. 2, an eyeglasses-type display device, such as a head-mounted display, may be used, as the display device 10, instead of a display panel. The head-mounted display has, for example, a display screen, which is about the same size as a spectacle lens and which is disposed to be opposite to human eyes. Further, the display device 10 comprised of the head-mounted display may include an imaging device (not shown). In case of the head-mounted display, an operator can use both hands when teaching a processing operation to the robot 1, and accordingly, can perform a teaching operation regardless of the position at which the display device 10 is installed.

Devices which constitute the laser processing robot system 100 will be more specifically described.

The robot 1 is an articulated robot for moving the laser irradiation device 2 attached to the distal end 1a of robot arm to a given position in the work space. FIG. 1 indicates a vertical articulated robot, but the present invention is not limited to this type of robot.

Servomotors (not shown) are provided for the corresponding joint axes of the robot 1. A position detecting sensor, e.g., a pulse coder for detecting an axis position (i.e., rotation angle) of each servomotor is provided in the robot 1.

The laser irradiation device 2 has a laser emitting port (not shown) for emitting a laser beam, which has been supplied from the laser oscillator 5, to the workpiece W. An irradiation position changing mechanism, e.g., a galvano mechanism that can change an irradiation position of the laser beam on the surface of the workpiece W to a predetermined position is provided within the laser irradiation device 2. Further, it is preferable that a lens for condensing a laser beam, and a lens position adjusting mechanism (not shown), which adjusts the position of the lens, to change the focal length of the laser beam, is provided within the laser irradiation device 2.

Alternatively, the laser irradiation device 2 may not have a mechanism, which can change the irradiation position or focal length, and accordingly, the irradiation position may fixed. In case of, for example, a laser processing head using a long focus lens, the focal length is fixed, but there is a sufficient distance between the workpiece W and the laser irradiation device 2, and accordingly, an effect of the present invention can be obtained.

Figure 3:
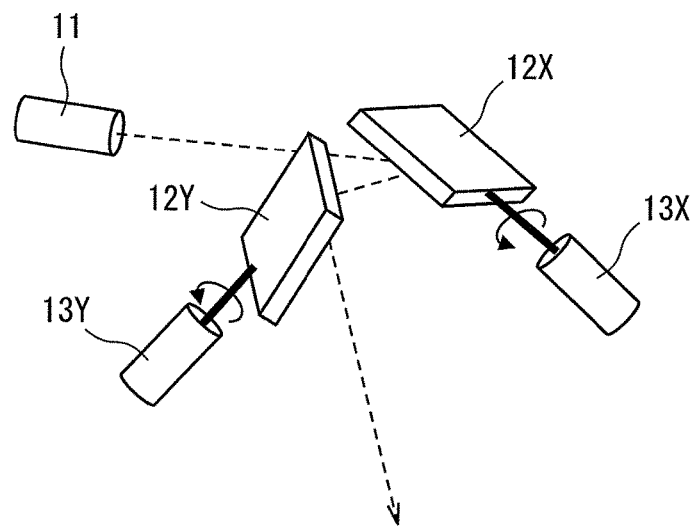
FIG. 3 is a view of a schematic configuration of a galvano mechanism.

FIG. 3 is a view of a schematic configuration of the galvano mechanism. The galvano mechanism shown, as an example, in FIG. 3 includes a pair of reflection mirrors 12X and 12Y arranged on a light path of a laser beam emitted from a laser light source 11, and motors 13X and 13Y for respectively rotating the reflection mirrors 12X and 12Y at a given angle. The rotation axes of the motors 13X and 13Y extend parallel to the reflection surfaces of the reflection mirrors 12X and 12Y themselves, and are connected, as the rotation axes of the reflection mirrors 12X and 12Y, to the reflection mirrors 12X and 12Y. The rotation axes of the motors 13X and 13Y are perpendicular to each other. In such a configuration, when one of the paired reflection mirrors 12X and 12Y, e.g., the reflection mirror 12X is stopped, and the other, i.e., the reflection mirror 12Y is rotated, the workpiece W is scanned in, for example, the Y-axis direction on the surface thereof by a laser beam. When the reflection mirror 12Y is stopped, and the reflection mirror 12X is rotated, the workpiece W is scanned in, for example, the X-axis direction on the surface thereof by a laser beam.

Thus, the irradiation position of a laser beam can be scanned and determined in X-Y axis direction on the surface of the workpiece W by causing the motors 13X and 13Y to respectively rotate the reflection mirrors 12X and 12Y at a desired angle.

Further, pulse coders (not shown) are provided at the rotation axes of the motors 13X and 13Y, to detect the rotation angle of the motors. Thus, the irradiation position of a laser beam on the surface of the workpiece W can be found based on the rotation angle detected by the pulse coders provided at the motors 13X and 13Y.

In the lens position adjusting mechanism, a motor for moving the lens is used, and it is preferable that a pulse coder (not shown) is provided at the rotation axis of the motor, to detect the rotation angle of the motor. This enables the focal position of the laser beam emitted to the workpiece W to be found based on the rotation angle detected by the pulse coder provided for the motor of the lens position adjusting mechanism.

The robot control device 3 includes a memory (not shown) for storing an operation program in which, for example, working operations or processing conditions of the laser processing are described, and controls the robot 1 while generating, in accordance with the operation program, commands for controlling the robot 1.

More specifically, the robot control device 3 provides a position command to the servomotor of each joint axis of the robot 1 in accordance with the operation program, and controls the servomotor so that the axis position of the servomotor, which is detected by the pulse coder provided for the servomotor, coincides with the position command. This causes the robot 1 to operate in accordance with the operation program stored in the memory.

It is preferable that the robot control device 3 includes a teaching operation board (not shown) for teaching a laser processing operation to the robot 1, to operate the robot 1. The operator uses the teaching operation board, to operate the robot 1 to perform a laser irradiating operation. In this instance, it is preferable that the working operations or processing conditions are written in the operation program stored in the memory of the robot control device 3 via the teaching operation board.

The robot control device 3 outputs command values regarding laser irradiation to the laser oscillator controlling device 6. The command values include irradiation conditions of a pulse laser, such as laser power, repetition frequency, and duty ratio. Alternatively, such irradiation conditions may be previously stored in the memory (not shown) of the laser oscillator controlling device 6, and the selection of any of the stored irradiation conditions and the timing of starting and ending of irradiation may be included in the commands from the robot control device 3.

In the former case, i.e., in the configuration in which the robot control device 3 outputs command values regarding laser irradiation to the laser oscillator controlling device 6, information regarding the irradiation conditions can be conveyed from the robot control device 3 to the image processing device 9.

In the latter case, i.e., in the configuration in which the irradiation conditions are previously stored in the memory of the laser oscillator controlling device 6, the irradiation conditions stored in the memory can be conveyed to the image processing device 9, which will be described later, via the robot control device 3. In this instance, although not illustrated, the irradiation conditions of the memory of the laser oscillator controlling device 6 may be directly conveyed to the image processing device 9.

The robot control device 3 also outputs command values regarding the irradiation position or focal position of a laser beam emitted from the laser irradiation device 2 to the laser irradiation device controlling device 4. The command values regarding the irradiation position or focal position can be conveyed from the robot control device 3 to the image processing device 9.

The laser irradiation device controlling device 4 is a device for controlling, based on the commands from the robot control device 3, motors for driving the galvano mechanism and the lens position adjusting mechanism provided in the laser irradiation device 2. The laser irradiation device controlling device 4 may be incorporated in the robot control device 3.

The laser oscillator 5 is a laser supply source for oscillating a laser to supply a laser beam to the laser irradiation device 2. Examples of the laser oscillator include a fiber laser, a $CO_2$ laser, a YAG laser, etc. In the present invention, any kind of laser oscillator, which can output a laser that can be used for processing, can be adopted.

The laser oscillator controlling device 6 controls, based on the commands from the robot control device 3, the laser oscillator 5 for oscillating a processing laser beam. Alternatively, as described above, the laser oscillator controlling device 6 may include a memory for storing irradiation conditions, and may select, in response to the commands from the robot control device 3, any of irradiation conditions from the memory, to control the laser oscillator 5.

The laser oscillator controlling device 6 may be incorporated in the robot control device 3.

Most of all, in this embodiment, a laser processing operation without output of a laser beam can be performed in response to the commands from the robot control device 3.

Note that the robot 1, the robot control device 3, and the image processing device 9 are each preferably comprised of a computer system (not shown) including a memory such as a ROM or RAM, a CPU, and a communication control unit, which are connected via a bus line.

It is preferable that the ROM included in the computer system constituting the image processing device 9 stores application software (program) which causes the computer system to function as the augmented reality image processing unit 9a. It is preferable that the function and operation of the augmented reality image processing unit 9a are performed, based on the program stored in the ROM, by the CPU of the image processing device 9, in cooperation with, for example, the robot control device 3, the laser irradiation device controlling device 4, or the display device 10.

Figure 4:
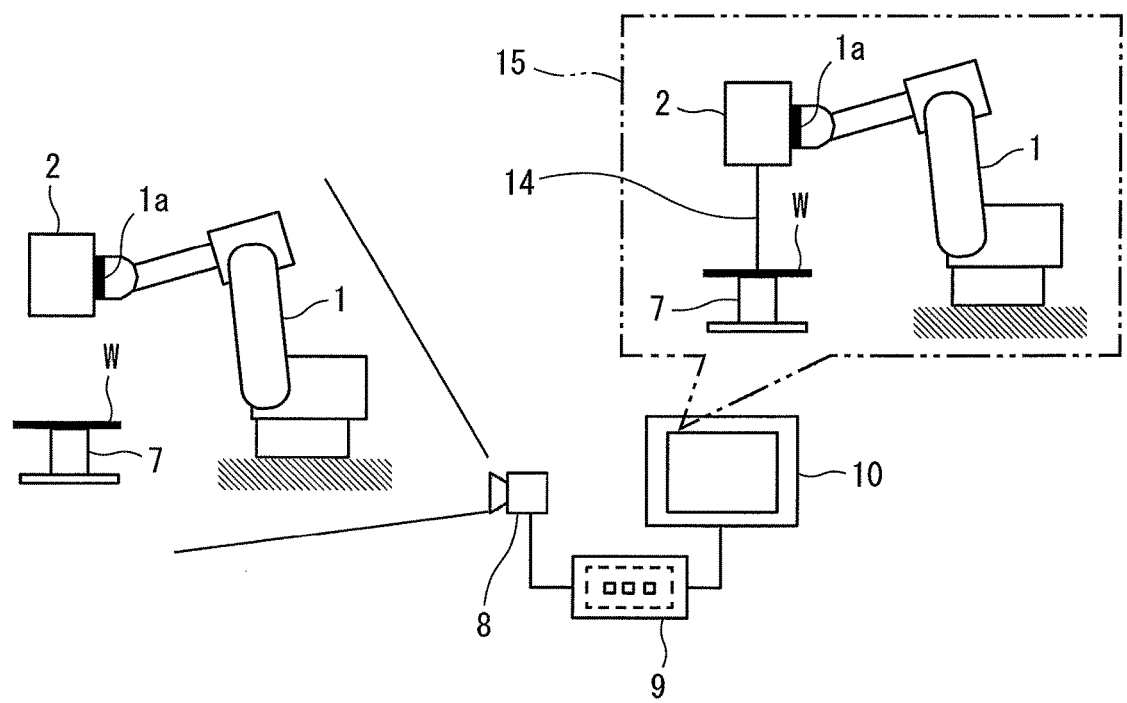
FIG. 4 is a view of an image of a state in which the laser processing robot system shown in FIG. 1 is used to perform laser processing.
Figure 5:
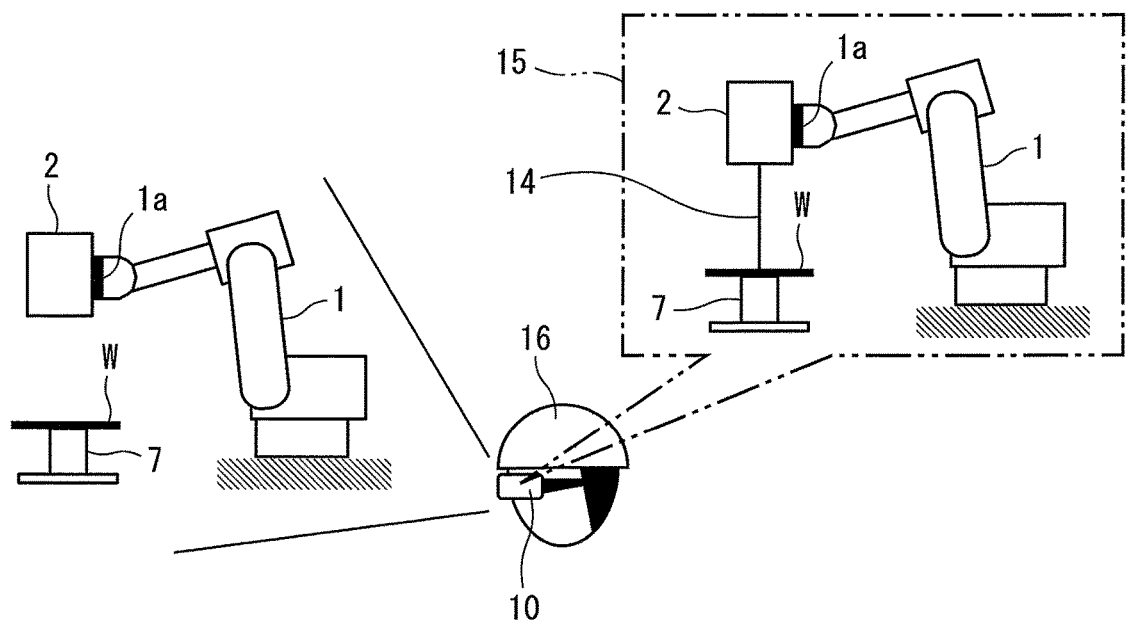
FIG. 5 is a view of an image of a state in which the laser processing robot system shown in FIG. 2 is used to perform laser processing.

FIG. 4 is a view of an image of a state in which the laser processing robot system shown in FIG. 1 is used to perform laser processing. FIG. 5 is a view of an image of a state in which the laser processing robot system shown in FIG. 2 is used to perform laser processing.

Suppose that, as shown in FIGS. 4 and 5, the laser irradiation device 2 attached to the distal end 1a of the robot arm is moved to a position above the workpiece W on the bench 7, and a laser processing operation without output of a processing laser beam from the laser irradiation device 2 is performed by the robot 1.

In this instance, in an example shown in FIG. 4, a working situation in the real space, an image of which is to be captured by the imaging device 8, and a virtual image 14 of a laser beam generated by an augmented reality technology are displayed on a screen 15 of the display device 10.

In an example shown in FIG. 5, the display device 10 is an eyeglasses-type head-mounted display having camera functions. In this instance, the camera functions of the eyeglasses-type head-mounted display that an operator 16 wears capture an image of a working situation in the real space. Then, the working situation in the real space and the virtual image 14 of a laser beam generated by an augmented reality technology are displayed on the screen 15 of the head-mounted display located so as to be opposite to the eyes of the operator 16.

More specifically, as shown in FIGS. 4 and 5, the virtual image 14 of a laser beam is generated by the augmented reality image processing unit 9a so that the laser irradiation device 2 virtually irradiates the workpiece W with the laser beam, and then is displayed on the display device 10.

Most of all, when the head-mounted display shown in FIG. 5 is adopted, the operator 16 can see a virtual state of the laser processing operation from anywhere.

(Operation)

The operation of the laser processing robot system 100 will now be described. In the laser processing robot system 100 shown, as an example, in FIG. 1, the operation for teaching a laser processing operation of the workpiece W to the robot 1 will be described. Of course, the operation that will be described below can also be applied to the laser processing robot system 100 shown, as an example, in FIG. 2.

In the laser processing robot system 100 shown in FIG. 1, the memory (not shown) of the robot control device 3 previously stores an operation program in which, for example, working operations or processing conditions of laser processing of the workpiece W are described. Further, the position of the bench 7 for securing the workpiece W or the position and attitude of the imaging device 8 are defined by a world coordinate system (also referred to as "base coordinate system") based on the installation position of the robot 1. The correlation between the position to be imaged by the imaging device 8 and the position of an object, such as the robot 1 in the real space is previously found by calibration.

In order to teach a laser processing operation to the robot 1, the operator operates the robot 1 via a teaching operation board, to move the laser irradiation device 2 of the distal end 1a of the robot arm to a position above the workpiece W on the bench 7, and to perform the laser processing operation using the robot 1. In this respect, the laser oscillator controlling device 6 controls the laser oscillator 5 so as not to supply a processing laser beam to the laser irradiation device 2. In other words, during teaching of a laser processing operation to a robot, a processing laser beam is set not to be output from the laser irradiation device 2 to the workpiece W.

During the teaching operation, the robot control device 3 transmits command values, which give instructions regarding the position of the distal end 1a of the robot arm to the robot 1, or command values, which give instructions regarding the rotation angle of the reflection mirror of the laser irradiation device 2 and the position of the lens to the laser irradiation device controlling device 4, to the image processing device 9.

An image of the state of a robot teaching operation is captured in real time by the imaging device 8. The captured image is transmitted to the image processing device 9.

In the image processing device 9, the augmented reality image processing unit 9a generates virtual images representing a laser beam obtained by assuming that the laser beam is emitted from the laser irradiation device 2 to a surface of the workpiece W, and a irradiation position of the laser beam, and superimposes the virtual images onto the actual image captured by the imaging device 8.

Figure 6:
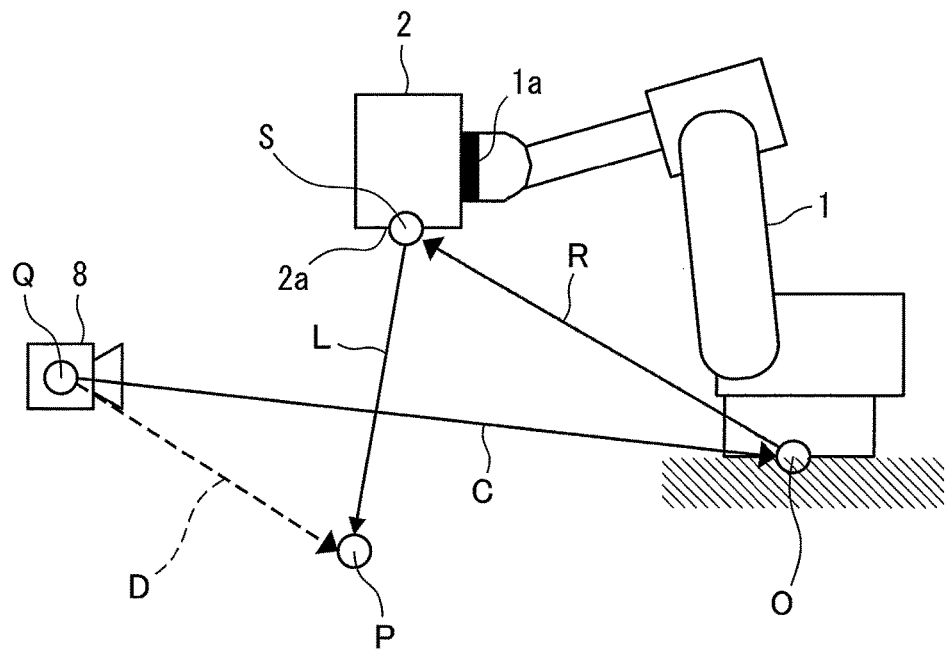
FIG. 6 is an explanatory view of a concept of a method for generating a virtual image of a laser beam on an image of a working situation in a real space.

FIG. 6 is an explanatory view of a concept of a method for generating a virtual image of a laser beam on an image of a working situation in a real space. The method for generating a virtual image of a laser beam on the captured actual image will be specifically described below with reference to FIG. 6.

First, in the real space, the installation position of the robot 1 is set as "point O", and the position of the laser irradiation port 2a of the laser irradiation device 2 attached to the distal end 1a of the robot arm is set as "point S", and then, a vector R connecting the point O and the point S is found (FIG. 6).

The point O is set as the origin of a processing operation performed by the arm of the robot 1. In this embodiment, the installation position of the robot 1 is set as the point O, but the stationary position on the main body of the robot 1 may be set as the point O.

Meanwhile, the point S can be found from the position of the distal end 1a of the robot arm with respect to the point O, and graphic information including position information of the laser irradiation port 2a of the laser irradiation device 2 attached to the distal end 1a.

Specifically, the position of the distal end 1a of the robot arm is found from command values regarding the position of the distal end 1a of the robot arm, which are output from the robot control device 3, or detection values (rotation angles) detected by the pulse coders provided in the servomotors of the joint axes of the robot 1. Further, the position of the point S is found from the mounting position of the laser irradiation device 2 with respect to the distal end 1a, and the position of the laser irradiation port 2a of the laser irradiation device 2 with respect to the mounting position.

The mounting position of the laser irradiation device 2 with respect to the distal end 1a, and the position of the laser irradiation port 2a can be obtained from the drawing information in the design of the laser irradiation device 2.

Subsequently, the position in a workpiece irradiated by the laser irradiation device 2, i.e., the laser irradiation position on the surface of the workpiece W is set as "point P", and a vector L connecting the point S and the point P is found using the point S, which has been obtained as the position of the laser irradiation port 2a of the laser irradiation device 2 (FIG. 6).

When the galvano mechanism (see FIG. 3) is provided in the laser irradiation device 2, the position of the point P can be found based on command values regarding the irradiation position, which are output from the robot control device 3 to the laser irradiation device controlling device 4, and the position of the point S, which has already been obtained. Alternatively, the position of the point P can be found based on detection values (rotation angles), which are actually detected by the pulse coders provided at the motors 13X and 13Y of the galvano mechanism, and the position of the point S, which has already been obtained.

When the laser irradiation device 2 further includes the lens position adjusting mechanism (not shown), the focal position of a laser beam can be found based on command values regarding the focal position, which are output from the robot control device 3 to the laser irradiation device controlling device 4, and the position of the point S, which has already been obtained. Alternatively, the focal position of a laser beam can be found based on detection values (rotation angles), which are actually detected by the pulse coder provided at the motor of the lens position adjusting mechanism, and the position of the point S, which has already been obtained.

Note that, when the laser irradiation device 2 does not have a mechanism which can freely change the irradiation position or focal length, and accordingly, the irradiation position is fixed, and the vector L connecting the point S and the point P can be easily found from the mechanical design information of the laser irradiation device 2.

Subsequently, in the real space, the installation position of the imaging device 8 is set as "point Q", and the position of the point O as the installation position of the robot 1 is used to find a vector C connecting the point Q and the point O (FIG. 6).

When the position of the imaging device 8 is fixed with respect to the installation position of the robot 1, the vector C can be found by previously calibrate both the positions.

Meanwhile, when the position of the imaging device 8 can be changed with respect to the installation position of the robot 1, the correlation between the initial installation position of the imaging device 8 and the installation position of the robot 1 is calibrated. Further, when the position of the imaging device 8 is changed, a gyro sensor, a three-dimensional acceleration sensor, a GPS (Global Positioning System), etc., which are not shown and contained in the imaging device 8, are used to find a moving distance from the initial installation position of the imaging device 8. This enables the vector C to be found even when the position of the imaging device 8 can be changed with respect to the installation position of the robot 1.

If the shape of the laser irradiation device 2 and the robot 1 is previously stored, as model data for three-dimensional model matching, in the imaging device 8, the relative position between the imaging device 8 and the robot 1 can be found by matching the three-dimensional model data with the captured image. Thus, the vector C may be found from the relative position information obtained by such a three-dimensional model matching operation.

Substantially, the vector C, the vector R, and the vector L, which have been obtained as described above, are combined, to find a vector D (the dashed line in FIG. 6). The vector D is a vector connecting the installation position (the point Q) and the laser irradiation position (the point P) of the imaging device 8.

Based on the information of the vector D, the laser irradiation position (the point P) or the laser irradiation direction from the laser irradiation device 2 can be displayed on the actual image captured at the installation position of the imaging device 8. This enables the augmented reality image processing unit 9a of the image processing device 9 to virtually generate a laser beam to be emitted from the laser irradiation device 2 or a laser irradiation position of the laser beam on the image captured by the imaging device 8.

Thus, the augmented reality image processing unit 9a generates virtual images representing a laser beam obtained by assuming that the laser beam is emitted from the laser irradiation device 2 to a surface of the workpiece W, and an irradiation position of the laser beam, and superimposes the virtual images onto the actual image captured by the imaging device 8. Then, the augmented reality image processing unit 9a displays the superimposed image on the display device 10. As shown in, for example, FIGS. 4 and 5, the virtual image 14 obtained by virtually emitting a laser beam from the laser irradiation device 2 attached to the robot 1 onto the surface of the workpiece W is displayed on the screen 15 of the display device 10.

Furthermore, during an operation, command values or detection values regarding the position of the distal end 1a of the robot 1, or command values or detection values regarding the irradiation position and irradiation conditions of a laser beam emitted from the laser irradiation device 2 or the focal length of a lens are conveyed from, for example, the robot control device 3 to the image processing device 9. Based on these values, the augmented reality image processing unit 9a of the image processing device 9 generates the virtual image 14.

Further, data regarding the relative position, e.g., the relative angle or the relative attitude, between the robot 1, to which the laser irradiation device 2 is attached, and the imaging device 8 are previously input to the image processing device 9. Thus, if the relative position between the robot 1 and the imaging device 8 is changed, the virtual image 14 of the laser beam is changed accordingly, so as to coincide with the actual image of the working situation of the robot 1, which has been captured by the imaging device 8. The same is true in the laser processing robot system 100 including the display device 10 comprised of a movable head-mounted display as shown in FIG. 2.

When the virtual image 14 of the laser beam is displayed on the display device 10 as described above, it is preferable that a displaying operation that will be described below is performed to enable the virtual image 14 of the laser beam to be easily seen.

When, for example, the augmented reality image processing unit 9a generates the virtual image 14 of the laser beam, at least one of the display color and the display size of the laser beam may be changed.

Specifically, the color of a laser beam to be displayed or the size of a light axis, the irradiation radius at the irradiation position of the laser beam, etc. may be freely changed.

In this instance, the augmented reality image processing unit 9a may change at least one of the display color and the display size of a laser beam in accordance with irradiation conditions for emitting the laser beam from the laser irradiation device 2. For example, depending on the magnitude of the power of a laser, the shading of the display color of the laser beam may be classified.

Further, the augmented reality image processing unit 9a may display the locus of at least one of the laser beam represented as the virtual image 14 and the irradiation position of the laser beam on the display device 10. If, for example, the locus of the laser irradiation position during teaching (i.e., the movement locus of a laser spot) is left, as an image, in the screen of the display device 10 even after the completion of teaching of a laser processing operation, the laser irradiation position can be more easily confirmed.

In cooperation with an image representing such a locus of the laser irradiation position, the information on laser irradiation conditions, e.g., numerical information on irradiation conditions of a pulse laser, such as laser power, repetition frequency, and duty ratio may be displayed on the display device 10. In other words, the augmented reality image processing unit 9a may be adapted to display the information on laser irradiation conditions on the display device 10 along with the virtual image 14 of a laser beam or laser irradiation position.

As seen above, according to this embodiment, an image of the laser beam emitted from the laser irradiation device 2 attached to the robot 1 can be virtually generated, and a virtual image of the generated laser beam can be superimposed onto the actual image of the robot 1 captured by the imaging device 8, and then displayed. In other words, according to this embodiment, an augmented reality technology is used to enable a processing laser beam as a virtual image and its irradiation position to be displayed on an image in the actual work space. Thus, even when a processing laser beam is not actually emitted, the operator can safely and easily see the processing laser beam and its irradiation position on the screen.

Most of all, the processing laser beam is virtually displayed, and accordingly, it is not necessary to mount a mechanism for emitting a pilot laser in the laser irradiation device. Further, there is no risk that a human body may be exposed to the processing laser beam.

These points are effective particularly when the laser processing robot system 100 is used to perform remote laser processing.

Alternatively, the laser processing robot system 100 may be adapted to project the virtual image 14 of, for example, the laser irradiation position on the real space using a projector, instead of displaying the same on the display device 10.

The present invention has been described above using exemplary embodiments. However, a person skilled in the art would understand that the aforementioned modifications and various other modifications, omissions, and additions can be made without departing from the scope of the present invention. Any appropriate combination of these embodiments is included in the scope of this disclosure.

EFFECT OF THE INVENTION

According to the first aspect of this disclosure, even when a processing laser beam is not actually emitted from the laser irradiation device attached to the arm of the robot, the state of irradiation with the processing laser beam can be virtually displayed on the actual image including the robot. Thus, the operator can safely and easily see the processing laser beam and its irradiation position on the screen.

According to the second aspect of this disclosure, if the laser irradiation device has a mechanism which can change the focal length of a laser beam, even when the processing laser beam is not actually emitted, a virtual image of the state of irradiation with the processing laser beam can be displayed.

According to the third aspect of this disclosure, if the laser irradiation device has a mechanism which can change the irradiation position of a laser beam, even when the processing laser beam is not actually emitted, a virtual image of the state of irradiation with the processing laser beam can be displayed.

According to the fourth aspect of this disclosure, the locus of a laser beam represented as a virtual image or a laser irradiation position can be displayed on the display device, and accordingly, even after the robot performs a laser processing operation without output of a laser beam, the laser irradiation position can be easily confirmed.

According to the fifth and seventh aspects of this disclosure, irradiation conditions of a laser beam can be visually monitored on the screen.

According to the sixth aspect of this disclosure, the visibility of a laser beam displayed on the display device and its irradiation position can be improved.

According to the eighth aspect of this disclosure, if a head-mounted display is adopted as a display device, the operator can see the state of a virtual laser processing operation from anywhere.

What is claimed is:

1. A laser processing robot system using a robot having an arm to which a laser irradiation device for emitting a laser beam for processing is attached, the laser processing robot system comprising:
   a robot control device controlling the robot to move the laser irradiation device to a position for processing a workpiece prior to outputting the laser beam;
   an imaging device capturing an actual image including the robot while the laser irradiation device is in the position for processing the workpiece prior to outputting of the laser beam;
   a display device for displaying, in real time, the actual image; and
   an image processing device which is connected to the robot control device and which has an augmented reality image processing unit for performing augmented reality image processing of the actual image, wherein
   prior to outputting the laser beam, the augmented reality image processing unit determines and superimposes a virtual image representing at least one of a virtual laser beam emitted from the laser irradiation device to the workpiece, and an irradiation position of the virtual laser beam onto the actual image and displays the superimposed image on the display device, the virtual image being determined based on at least the position of the laser irradiation port relative to the workpiece prior to outputting the laser beam.

2. The laser processing robot system according to claim 1, wherein
   the laser irradiation device comprises a lens position adjusting mechanism which adjusts the position of a lens in response to a command from the robot control device, to change a focal length, and
   the augmented reality image processing unit is adapted to generate the virtual image based on a command value or a detection value regarding the focal length and the position of the lens.

3. The laser processing robot system according to claim 1, wherein
   the laser irradiation device comprises an irradiation position changing mechanism for changing the irradiation position of the laser beam on a surface of the workpiece in response to a command from the robot control device, and the augmented reality image processing unit is adapted to generate the virtual image based on a command value or a detection value regarding the irradiation position.

4. The laser processing robot system according to claim 1, wherein the augmented reality image processing unit is adapted to display the locus of at least one of the laser beam represented as the virtual image and the irradiation position of the laser beam on the display device.

5. The laser processing robot system according to claim 1, wherein
the robot control device is adapted to convey information regarding irradiation conditions for irradiation with the laser beam to the image processing device, and
the augmented reality image processing unit is adapted to display, along with the virtual image, the information regarding the irradiation conditions on the display device.

6. The laser processing robot system according to claim 1, wherein the augmented reality image processing unit is adapted to change at least one of the display color and display size of the laser beam when the virtual image is generated.

7. The laser processing robot system according to claim 6, wherein the augmented reality image processing unit is adapted to change at least one of the display color and display size of the laser beam in accordance with irradiation conditions for irradiation with the laser beam.

8. The laser processing robot system according to claim 1, wherein the display device is a head-mounted display configured to be integral with the imaging device.

* * * * *